June 4, 1957  P. LEMAIGRE-VOREAUX  2,794,932
GAS ABSORBENT MATERIAL
Filed Jan. 9, 1952

INVENTOR:
PIERRE LEMAIGRE-VOREAUX
By: Young, Emery + Thompson
Attys.

United States Patent Office 2,794,932
Patented June 4, 1957

2,794,932

GAS ABSORBENT MATERIAL

Pierre Lemaigre-Voreaux, Paris, France, assignor to Societe Anonyme Pour les Applications de l'Electricite et des Gaz Rares-Etablissements Claude-Paz & Silva, Paris, France Application January 9, 1952, Serial No. 265,643

Claims priority, application France January 12, 1951

6 Claims. (Cl. 313—178)

This invention relates to a gas absorbent material comprising essentially at least one metal selected from the group consisting of tantalum and zirconium, the material being intended to be used in apparatus wherein use is made of electricity.

It is known that the above-mentioned metals absorb gases, other than rare gases, by processes which depend on the metal and on the gas, and which are generally a chemical combination or a dissolution. At not too high temperatures, the rapidity of absorption increases with increasing temperature of the metal; when this temperature is too high, however, the metal may release all or part of the gases it has absorbed at lower temperatures.

Due to this property of absorbing gases, tantalum and zirconium are used as getters, i. e. for removing undesirable gases particularly in vacuum or gas filled electronic apparatus.

The fact that the absorbent material comprises essentially tantalum or zirconium means that in this material, absorption is effected, at least for its greater part, by tantalum or zirconium. The absorbent material according to the invention may comprise, as a more or less important portion, substances other than tantalum and zirconium, which substances may be emissive or inert, conducting or insulating materials or other substances acting as getters, etc.

When zirconium coated with zirconium oxide is used, it must not be heated, during the normal operation of the apparatus in which it is used, up to, or above, a temperature so high that this oxide is noticeably absorbed by zirconium metal. This temperature is about 700° C.

One object of this invention is to provide gas absorbent material which may constitute parts of electric discharge apparatus from which discharges cannot start.

Another object of this invention is to provide gas absorbent material which cannot short-circuit live conducting parts.

Still another object of this invention is to provide a gas absorbent material comprising essentially a gas absorbent metal coated with a highly resistive coating of an anti-emissive substance, the coating being permeable to the gases to be absorbed.

The term "anti-emissive" is applied here to any coating hindering the production of discharges from the surface it covers. The permeability of the coating may be substantial only in the conditions to which the subjacent metal is subjected during the normal operation of the apparatus for which the absorbent material is used; the permeability may be due to interstices in the coating, to an intermediate dissolution of the gases in the anti-emissive substance, to an equilibrium reaction of the gases with said substance and with the absorbent metal, or to other reasons.

In drawings, which illustrate embodiments of the invention,

Figure 1:
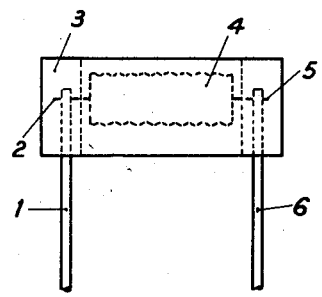
Figure 1 is an elevational view of an electrode for an electric discharge apparatus.
Figure 2:
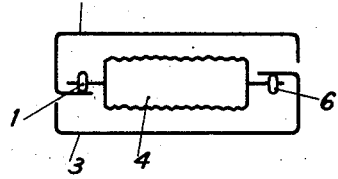
Figure 2 is a plan view of the same electrode.

The electrode shown in Figures 1 and 2, has a coil 4, of molybdenum wire coated with emissive substances. This coil is secured to nickel lead-in wires 1 and 6, by pinching its ends 2 and 5 in the hook-like ends of said lead-in wires.

Two thin tantalum sheets 3 and 7, folded so as partly to enclose the coil 4, are welded to the lead-in wires 6 and 1 respectively. Each one of these sheets 3, 7 has, for example, a thickness of 0.1 mm., a width of 5 mm. and a developed length of 15 mm. The tantalum is coated with an oxide layer obtained electrolytically by passing an electric current between the tantalum sheet, welded to its lead-in wire 1 or 6 which sheet acts as an anode, and a tungsten cathode, these two electrodes being immersed in nitric acid of a low concentration. Electrolysis is carried out under a D. C. voltage of about 100 volts. The value of the electrolysis current decreases as the oxide layer thickens; when this value is substantially zero, electrolysis is stopped. The oxide layer thus obtained, the thickness of which is of the order of one micron, is sufficiently thin to allow gases to pass through it and reach the subjacent tantalum metal where they are absorbed; it is sufficiently thick to prevent the sheets 3 and 7 from acting as an anode or cathode when the electrode shown in Figs. 1 and 2 is mounted in an electric discharge apparatus. The sheets 3 and 7, during the operation of the electric discharge apparatus utilizing the electrode shown, are raised to a relatively low temperature; but as their surface is fairly large, they absorb, nevertheless, in a sufficient manner the detrimental gases existing inside the electric discharge apparatus during the operation thereof. Said gases may have been left over as a result of a poor degassing of this apparatus, or may be released for instance by the electrodes.

The anti-emissive oxide coating on the sheets 3 and 7 prevents them from acting as electrodes; the anode and cathode glows remain therefore, at each half-period of the current, when this current is alternating, localized in the vicinity of the coil 4, instead of passing from the latter to the sheets, and vice versa; thus the luminous flicker of the ends of the lamp comprising such electrodes is decreased.

Another advantage of this anti-emissive coating in the case of alternating current is that, since the sheets can no longer act as anodes, the coil 4 is heated by the entire heat evolved at the electrode by the anode and cathode voltage drops, which makes it possible to give it larger dimensions and, hence, to contain a larger store of emissive materials than if it were acting only as a cathode.

Still another advantage is that this coating prevents the formation of a cathode spot on one of these sheets; such a spot would locally heat the tantalum which, then, would release the gases it absorbed previously.

The above arrangement shown for the sheets enables them to intercept an important part of the particles emitted by ionic sputtering by the coil 4. If such an advantage is of little importance from the standpoint of a possible economy of tantalum, sheets with a smaller area may be used, or that sheet which is attached to the lead-in wire not connected to the current source may even be omitted.

Figure 3:
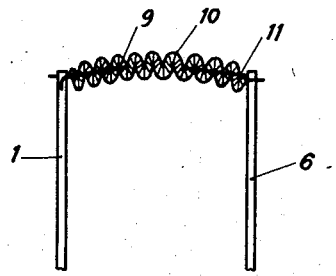
Figure 3 is an elevational view of another electrode for an electric discharge apparatus.
Figure 4:
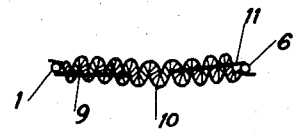
Figure 4 is a plan view of the electrode shown in elevation in Figure 3.

Figures 3 and 4 show, respectively, in elevation and in plan, an electrode comprising mainly a double wound tungsten filament, 10, coated with emissive substances; the ends of this filament are welded to the lead-in wires 1, 6 of the electrode.

Here, the absorbent materia lis in the shape of two tantalum wires 9 and 11, welded to the lead-in wires 1 and 6 and placed inside the larger of the two coils in which the tungsten filament is wound. This location allows the tantalum to be heated, during the operation of the discharge apparatus having the electrode shown in Figures 3 and 4, to a temperature at which tantalum absorbs undesirable gases fairly rapidly. Here again, the tantalum is coated with a layer of tantalum oxide of the order of one micron by anodic oxidation, as in the foregoing example. This coating offers the advantage, on the one hand, of avoiding the short-circuiting of part of the winding 10 in case the latter comes in contact with one of the wires 9 and 11, and on the other hand, of preventing the discharge from starting from one of the wires and hence heating the latter to the point where it gives up the absorbed gases.

The electrode shown comprises two tantalum wires, 9 and 11; in some cases, if there is little gas to be absorbed, one wire only may be sufficient.

Figure 5:
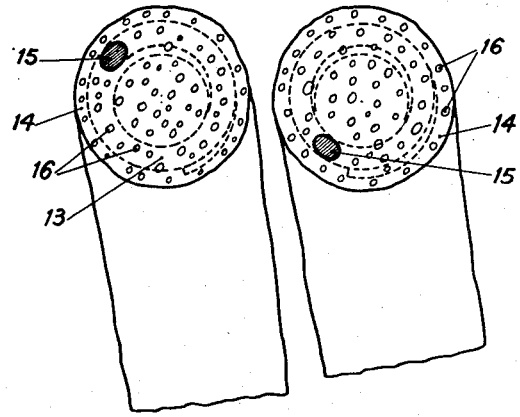
Figure 5 is a transverse section of a portion of another electrode for an electric discharge apparatus.

Figure 5 shows, in section through the plane passing through the lead-in wires, 1 and 6, a portion of an electrode having a coiled coil filament, similar to that shown in Figures 3 and 4, but in which the absorbent material is arranged differently. The tungsten filament 15, 0.08 mm. in diameter, for instance, is wound into a primary helix 13 with an inner diameter of 0.15 mm. for instance; this primary helix, a few turns of which only are shown in Figure 5, is itself wound into a secondary helix with an inner diameter of 0.7 mm., which is that shown at 10 on Figures 3 and 4. The emissive coating 14 of the helix 13 comprises, at least in part after treatment, barium oxide and small amounts of metallic barium; this emissive coating, in addition, in the present case, comprises tantalum grains 16 oxidized superficially.

This oxidizing may be effected either before the grains are mixed with the activating substance giving rise to the emissive oxides, or during the formation of said oxides. It is possible, for instance, to operate as follows: First, the double wound wire 15 is coated with a mixture of hydrated baryta and tantalum in nonoxidized grains, and an electric current is passed through the filament 15 so as to melt the baryta. Then the electrode comprising this filament 15 is mounted, together with a similar electrode, in the envelope of the electric discharge apparatus in which it is desired to use these electrodes; this assembly is then degassed by heating in vacuum, which dehydrates the baryta, and is then subsequently filled with a rare gas. Finally, a discharge is caused to pass between the electrodes so as to "activate" them, i. e. to reduce part of the baryta into metal barium. This activation by discharges in a rare gas atmosphere may consist, for instance, if the support of the emissive layer is a coiled coil tungsten filament 0.08 mm. in diameter, in a succession of discharges of 10 seconds each, separated by rest periods of 5 seconds, this being carried out for a half-hour; each discharge is started without pre-heating the electrodes, by using a sufficient voltage, and offers a current value of 0.475 ampere, which is slightly higher than the normal current of 0.420 ampere of the discharge in the electric discharge apparatus in which the electrode being activated will be mounted. All these operations are known, for the manufacture of fluorescent lamps for instance; in the present case, they have an additional effect: the tantalum grains are surface oxidized by the baryta, particularly during the activation of the electrodes, which provides them with an anti-emissive oxide coating. When using an activating substance other than barium hydrate, a suitable treatment is employed for surface oxidizing the tantalum or zirconium; this treatment may, in some cases, be similar to that required for the manufacture of the electrode employing this other activating substance when the emissive mixture does not contain either tantalum or zirconium, but adapted so as to obtain the desired surface oxidizing.

By way of example, an electrode designed for a lamp with a discharge current of 0.4 ampere, may comprise 5 milligrams of barium oxide and 1 to 2 milligrams of tantalum in grains of about 400 mesh. The oxide layer covering the metal grains offers the advantage that these grains do not increase the conductivity of the emissive layer, as would be the case with bare metal grains.

In the above embodiments, tantalum only has been indicated as a gas absorbing metal, this metal being, in general, easier to use than zirconium. Zirconium, however, which is only very slightly volatile and which absorbs gases particularly well at a fairly high temperature, may also be used.

The absorbent material according to the present invention may also be used when the emissive materials are obtained from activating substances other than barium compounds, for example from compounds of other alkaline earth metals, mixed or not with barium compounds or from thorium oxide.

Numerous other forms and applications of the absorbent material may be imagined within the scope of the present invention.

The tantalum or zirconium metal may, for instance, be coated with alumina or magnesia or other suitable electrically insulating substance, instead of an oxide of the metal.

The present invention may also have applications other than to gaseous electric discharge apparatus. For instance, the tantalum or zirconium tapes or wires used for improving the vacuum inside an enclosure, for example in a container where deposits are effected by evaporation in vacuum, may also be provided with an insulating coating; in such a case, it is possible to place the tapes or wires in the immediate vicinity of or inside the tungsten heating coil carrying the metal to be evaporated, said tapes or wires being placed in positions similar to that of the sheets 3, 7 or of the wires 9, 11.

I claim:

1. A process for the manufacture of an electrode for gaseous electric discharge lamp comprising gas absorbent material and at least one electrode, said electrode having a support and a coating of electron-emissive substance on the support, which comprises, providing particles of at least one metal selected from the group consisting of tantalum and zirconium with a coating of highly resistive substance, this coating being permeable to the gases to be absorbed and being sufficiently thick to resist the emission of electrons from the metal, mixing said coated particles with activating substances, coating said support with said mixture, and subjecting said mixture to a heat treatment adapted to change activating substances to electron-emitting substances.

2. A process for the manufacture of an electrode for gaseous electric discharge lamp comprising gas absorbent material and at least one electrode, said electrode having a support and a coating of electron-emissive substance on the support, which comprises, mixing particles of at least one metal selected from the group consisting of tantalum and zirconium with oxidizing activating substances, coating the support with said mixture, and subjecting said mixture to a heat treatment adapted to change said activating substances to electron emitting substances and to superficially oxidize said particles, said superficial oxide constituting a coating permeable to the gases to be absorbed and sufficiently thick to resist the emission of electrons from the metal.

3. A gaseous electric discharge lamp having a sealed envelope and comprising therein an electrode and a gas absorbent material or "getter," said electrode having a coating of electron-emissive substance, said material or "getter" comprising at least one metal selected from the group consisting of tantalum and zirconium and being in contact with the discharge atmosphere of said lamp and being heated by the electrode of the lamp when the lamp is in operation, said material or "getter" having a coating of oxide of said metal which coating is permeable to the gases to be absorbed and is of sufficient thickness to resist the emission of electrons from the metal constituting the gas absorbent material.

4. A discharge lamp as set forth in claim 3, wherein the material takes the form of a thin sheet located in the vicinity of the electrode.

5. A discharge lamp as set forth in claim 3, wherein the electrode comprises a filament wound into a helix, and wherein the material is located inside the helix.

6. A discharge lamp as set forth in claim 3, wherein said gas absorbent material is mixed with said electron emissive substance.

References Cited in the file of this patent

UNITED STATES PATENTS

| | | |
|---|---|---|
| 1,787,672 | Davenport | Jan. 6, 1931 |
| 1,859,029 | Boer | May 17, 1932 |
| 1,890,926 | Anderson | Dec. 13, 1932 |
| 1,899,419 | Kerk | Feb. 28, 1933 |
| 1,925,307 | De Boer et al. | Sept. 5, 1933 |
| 1,964,506 | De Boer et al. | June 26, 1934 |
| 2,130,190 | Lederer | Sept. 13, 1938 |
| 2,368,060 | Wooten | Jan. 23, 1945 |
| 2,368,688 | Taylor | Feb. 6, 1945 |
| 2,486,436 | Rothstein | Nov. 1, 1949 |
| 2,566,908 | Ruscetta | Sept. 4, 1951 |